Patented Nov. 26, 1935

2,022,389

UNITED STATES PATENT OFFICE 2,022,389

RESIN AND COATING OR PLASTIC COMPOSITION CONTAINING THE SAME

George W. Seymour, Cumberland, Md., assignor to Celanese Corporation of America, a corporation of Delaware No Drawing. Application April 16, 1932, Serial No. 605,793

12 Claims. (Cl. 260—3)

This invention relates to the preparation of a synthetic resin from a sulfonamid of a phenol ether and an aldehyde, and also to coating or plastic compositions containing derivatives of cellulose and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing derivatives of cellulose, which resin is compatible with the other constituents of the lacquers and which produces clear solutions which upon drying form films that are adherent, tough and hard, and fast to light.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced therefrom become cloudy and unhomogeneous.

I have found that synthetic resins produced by the condensation of a sulfonamid of a phenol ether with an aldehyde in the absence or presence of a suitable catalyst are compatible with cellulose acetate, and that when added to lacquers containing cellulose acetate they form clear solutions that upon drying produce clear, hard and tough and firmly adherent films, which are fast to light.

In accordance with my invention, I prepare special synthetic resins formed by the reaction of a sulfonamid of a phenol ether with an aldehyde. These synthetic resins are then used for making a lacquer or plastic composition which contains one or more derivatives of cellulose and a volatile solvent. The lacquer may contain also one or more natural or semi-synthetic resins or gums, one or more plasticizers or softening agents, medium and/or high boiling point solvents and preferably, but not necessarily, some pigments and/or dyes.

Solutions thus formed may be employed as a lacquer or composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

Molding compositions may be made by intimately mixing the organic derivative of cellulose with the special resin with or without plasticizer, and these compositions may be molded under heat and pressure to form any articles of desired shape.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methylcellulose and benzyl cellulose.

The low boiling point solvent that may be employed may be one or a mixture of two or more of the following: Acetone, ethylene formal, alcohol, benzene or ethylene dichloride. Examples of medium and/or high boiling point solvents are ethyl acetate, ethyl lactate, formal glycerol, tetrachlorethane, benzyl alcohol or diacetone alcohol. Of course it is understood that the choice of the solvents depends on the solubility characterics of the particular derivative of cellulose employed. Examples of suitable plasticizers are diphenylol propane, triacetin, dibutyl tartrate, diethyl phthalate, dimethyl phthalate, toluene sulfonamid, mono methyl xylene sulfonamid, and the sulfonamids of the phenol ethers themselves. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, acaroides, pontianak, kauri, dammar, rosin and shellac. The semi-synthetic resin, ester gum, which is the glycerol ester of rosin may be also added. If desired, synthetic resins, other than the special phenol ether sulfonamid-aldehyde resin may be employed in conjunction therewith, and examples of these are the fusible and soluble phenol-formaldehyde or diphenylol propane-formaldehyde resins preferably prepared in the presence of acid catalysts.

To form the resin a phenol ether sulfonamid is reacted with an aldehyde by heating the same in the presence or absence of a suitable catalyst.

Any suitable sulfonamid of an ether of phenol may be employed for making the resin. While I prefer to use anisol sulfonamid, $$CH_3.O.C_6H_4.SO_2.NH_2,$$

other phenol ether sulfonamids may be employed; that is sulfonamids of the ethers of phenol, cresols, naphtols and the like, wherein one or more of the hydrogen atoms of the OH groups of the phenols is replaced by alkyl, aryl, aralkyl or other groups. Examples of such phenol ether sulfonamids, in addition to anisol sulfonamid, are the sulfonamid of phenetol, $$C_2H_5.O.C_6H_4.SO_2.NH_2,$$

the sulfonamids of ethyl or metyl ethers of alpha- or beta-naphthol, the sulfonamids of the methyl or ethyl ethers of resorcinol or pyrocatechol, the sulfonamid of diphenyl ether, etc. These compounds also include the alkyl sulfonamids of these phenol ethers, such as methy-, ethyl-, dimethyl- or diethyl-sulfonamids, an example being ethyl anisol sulfonamid, $$CH_3.O.C_6H_4.SO_2.NH.C_2H_5.$$

The sulfonamids of the phenol ethers may be prepared by reacting the ether with sulfuric acid, converting the sulfonic acid so formed into the sodium or patassium salt, treating this sulfonate with phosphorous pentachloride to convert the same into the sulpho chloride, and treating the sulpho chloride with ammonia or substituted ammonias to form the sulfonamid.

In order to prepare the resin forming the subject matter of this invention, the phenol ether sulfonamid is heated with a suitable aldehyde such as formaldehyde, paraformaldehyde, formalin, metaformaldehyde, acetaldehyde or hexamethylene tetramine. Thus for instance anisol sulfonamid may be reacted with formaldehyde by heating the same in the presence or absence of a catalyst such as hydrochloric acid until resin formation sets in.

The following examples serve to illustrate coating or plastic compositions made in accordance with this invention.

*Example I*

A coating composition containing the resin may be made as follows:

| | Parts by weight |
|---|---|
| Cellulose acetate | 10 |
| Synthetic resin | 1 to 20 |
| Acetone | 100 |

*Example II*

The following is another example of coating composition:

| | Parts by weight |
|---|---|
| Cellulose acetate | 10 |
| Synthetic resin | 1 to 20 |
| Acetone | 50 |
| Benzene | 25 |
| Alcohol (ethyl or denatured) | 25 |
| Diacetone alcohol | 20 |

*Example III*

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic resin | 25 |
| Acetone | 60 |
| Ethyl acetate | 30 |
| Ethyl lactate | 10 |

*Example IV*

Following is an example of a plastic composition:

| | Parts by weight |
|---|---|
| Cellulose acetate | 100 |
| Synthetic resin | 40 |
| Monomethyl xylene sulfonamid | 10 |
| Alcohol | 50 |
| Benzene | 50 |

*Example V*

The following is an example that may be employed for making artificial yarn by extruding through the orifices of a spinneret into a heated, evaporative atmosphere:

| | Parts by weight |
|---|---|
| Cellulose acetate | 100 |
| Synthetic resin | 20 |
| Acetone | 400 |

*Example VI*

The following is a formula for pigmented lacquer:

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

*Example VII*

The following examples are given to illustrate the use of a synthetic resin in connection with cellulose nitrate for various purposes: (a) coating composition may contain:

| | |
|---|---|
| Cellulose nitrate | 6 kilograms |
| Camphor | 2 Do. |
| Diethyl phthalate | 2 Do. |
| Synthetic resin | 10 Do. |
| Benzene | 20 liters |
| Alcohol | 20 Do. |
| Butyl alcohol | 20 Do. |
| Butyl acetate | 20 Do. |
| Ethyl acetate | 30 Do. |

(b) An adhesive solution suitable for use in the preparation of laminated glass may contain:

| | |
|---|---|
| Cellulose nitrate | 0.4 kilograms |
| Camphor | 0.1 Do. |
| Dibutyl phthalate | 0.1 Do. |
| Synthetic resin | 1.0 Do. |
| Benzene | 20 liters |
| Alcohol | 10 Do. |
| Butyl alcohol | 20 Do. |
| Butyl acetate | 20 Do. |
| Ethyl acetate | 30 Do. |

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of my invention.

Having described my invention, what I claim and desire to secure by Letters Patent is:

1. Method of preparing a synthetic resin comprising reacting the sulfonamid of a phenol ether with formaldehyde.

2. Method of preparing a synthetic resin comprising reacting anisol sulfonated with an aldehyde.

3. Method of preparing a synthetic resin, which comprises heating the sulfonamid of a phenol ether with an aldehyde.

4. Method of preparing a synthetic resin, which comprises heating the sulfonamid of a phenol ether with an aldehyde in the presence of hydrochloric acid.

5. Method of preparing a synthetic resin, which comprises heating the sulfonamid of a phenol ether with formaldehyde.

6. Method of preparing a synthetic resin comprising heating the sulfonamid of a phenol ether with formaldehyde in the presence of hydrochloric acid.

7. Method of preparing a synthetic resin, which comprises heating anisol sulfonamid with formaldehyde in the presence of a strong acid.

8. Method of preparing a synthetic resin, which comprises heating anisol sulfonamid with formaldehyde in the presence of hydrochloric acid.

9. A synthetic resin formed by the reaction of the sulfonamid of a phenol ether with an aldehyde.

10. A synthetic resin formed by the reaction of ainsol sulfonamid with formaldehyde.

11. A synthetic resin containing an ether linkage and which is formed by the reaction of an anisol sulphonamid and an aldehyde.

12. A synthetic resin containing an ether linkage and which is formed by the reaction of an anisol sulphonamide and formaldehyde.

GEORGE W. SEYMOUR.

CERTIFICATE OF CORRECTION.

Patent No. 2,022,389.  November 26, 1935.

GEORGE W. SEYMOUR.

It is hereby certified that error appears in the printed specification of the above numbered patent requiring correction as follows: Page 3, second column, line 4, claim 2, for "sulfonated" read sulfonamid; and that the said Letters Patent should be read with this correction therein that the same may conform to the record of the case in the Patent Office.

Signed and sealed this 7th day of January, A. D. 1936.

Leslie Frazer (Seal)  Acting Commissioner of Patents.